(12) United States Patent
Aoki et al.

(10) Patent No.: US 6,224,327 B1
(45) Date of Patent: May 1, 2001

(54) STEAM-COOLING TYPE GAS TURBINE

(75) Inventors: Sunao Aoki; Katsunori Tanaka; Kazuharu Hirokawa; Rintaro Chikami, all of Hyogo-ken (JP)

(73) Assignee: Mitsubishi Heavy Idustries, Ltd., Tokyo (JP)

( * ) Notice: Subject to any disclaimer, the term of this patent is extended or adjusted under 35 U.S.C. 154(b) by 0 days.

(21) Appl. No.: 09/250,733

(22) Filed: Feb. 16, 1999

(30) Foreign Application Priority Data

Feb. 17, 1998 (JP) .................................................. 10-034740
Jun. 16, 1998 (JP) .................................................. 10-065523

(51) Int. Cl.$^7$ ...................................................... F04D 29/58
(52) U.S. Cl. ............................. 415/115; 415/114; 416/95; 416/96 R
(58) Field of Search .................................... 415/114, 115, 415/116; 416/95, 96 R, 96 A, 97 R; 285/387, 373

(56) References Cited

U.S. PATENT DOCUMENTS

| 4,877,270 | * | 10/1989 | Phillips ............................... 285/387 |
| 5,029,876 |   | 7/1991  | Orlando et al. . |
| 5,558,496 | * | 9/1996  | Woodmansee et al. ........... 416/96 R |
| 5,695,319 | * | 12/1997 | Matsumoto et al. .................... 416/95 |
| 6,007,299 | * | 12/1999 | Uematsu ............................ 416/96 R |
| 6,053,701 | * | 4/2000  | Ichiryu et al. ...................... 416/96 R |

FOREIGN PATENT DOCUMENTS

| 0 028 217 A1 | 10/1980 | (EP) .................................. F01D/5/06 |
| 0 735 238 A1 | 10/1996 | (EP) .................................. F01D/5/08 |
| 0 894 942 A2 | 2/1999  | (EP) .................................. F01D/5/08 |
| 7-189739     | 7/1995  | (JP) .................................. F01D/7/18 |
| 9-144501     | 6/1997  | (JP) . |
| 9-195702     | 7/1997  | (JP) . |
| 9-256815     | 9/1997  | (JP) . |
| 10-018802    | 1/1998  | (JP) .................................. F01D/5/08 |
| WO 98/49426  | 11/1998 | (WO) ............................. F01D/11/02 |

* cited by examiner

Primary Examiner—Edward K. Look
Assistant Examiner—Richard Woo
(74) Attorney, Agent, or Firm—Sughrue, Mion, Zinn, Macpeak & Seas, PLLC

(57) ABSTRACT

A steam-cooling gas turbine in which cooling steam is fed from a center portion of a rotating shaft and recovered through passages disposed at the outer side of the center portion with steam leaking through a seal portion from a feeding steam being effectively recovered. Feed steam (30) serving as coolant is supplied to a cavity (27) from a inner cylinder (10) and hence fed to moving blades (11, 12) through recesses (40) formed in a coupling portion (26) interposed between a final-stage disk (24) and a turbine shaft (1), steam feeding pipes (15) and steam feeding passages (11a, 12a). After cooling of the moving blades, steam (31) is recovered through steam recovering passages (11b, 12b), steam recovering pipes (16), radial steam-recovering passages (17), axial steam-recovering passages (18) and outlet openings (5a). The coupling portion (26) is forced to hermetically close under thermal stress, whereby leakage of the feed steam (30) is prevented. Steam leaking through a seal portion constituted by stationary and rotatable seal fin assemblies (4a, 4b) can be effectively recovered. The inner cylinder (10) can move in the axial direction through cooperation of piston rings (43) and a centering piece (6) adapted for absorbing thermal stress induced in the inner cylinder (10). Upstream tip end portions of steam feeding pipes (15) and steam recovering pipes (16) are secured onto a side surface of the first-stage disk (21) through sleeves removably fitted thereto.

20 Claims, 9 Drawing Sheets (a)

(b)

STEAM-COOLING TYPE GAS TURBINE

BACKGROUND OF THE INVENTION

1. Field of the Invention

The present invention generally relates to a steam-cooling type gas turbine and more particularly to an improved cooling structure therefor which can effectively prevent leakage of coolant steam.

2. Description of Related Art

A combined cycle power plant comprised of a combination of a gas turbine plant and a steam turbine plant is designed such that the gas turbine is operated in a high temperature region with the steam turbine operated in a low temperature region in a sharing mode to efficiently recover thermal energy for effective utilization thereof. In recent years, this type of power generating system has been attracting public attention from the standpoint of high thermal efficiency.

In conjunction with the cooling of moving blades of the gas turbine in the combined cycle power plant such as mentioned above, it is noted that in the present state of the art, a steam cooling system is replacing an air cooling system. Parenthetically, in the steam cooling system, a part of steam generated in the steam turbine is extracted to be led to the gas turbine for cooling the moving blades thereof, and the steam having a temperature raised after cooling of the moving blades of the gas turbine is recovered to be fed back to the steam turbine cycle to achieve more effective utilization of thermal energy. Thus, it is expected that the steam cooling system can contribute to improvement of the operation efficiency of the combined cycle power plant. For this reason, the steam cooling system is attracting attention in these years.

FIG. 13 is a sectional view showing schematically a portion of a typical one of the conventional steam-cooling type gas turbines. In the figure, reference numerals 50 and 51 denote casings of a compressor and the gas turbine, respectively, wherein a rotor 60 having a large number of moving blades mounted therearound in rows and designated representatively by reference numerals 71, 72 and 73 is disposed within the turbine casing 51. A high temperature combustion gas discharged from the associated combustor is introduced through a combustion gas passage 52 into spaces defined between stationary blades 83; 84; 85 disposed on the inner wall surface of the turbine casing 51 and the moving blades 71; 72; 73 to undergo expansion, to thereby force the rotor 60 to rotate.

On the other hand, there are formed in a disk 61 of the rotor 60 a plurality of circumferentially distributed steam passages 63 which extend axially through the disk. The coolant or cooling steam 80 is introduced into the individual steam passages 63 from a steam inlet 65 disposed in a turbine shaft 64 to flow through other passages 62 formed similarly in the disk 61, wherein a part of the cooling steam 80 enters a cavity 66 and hence flows into moving blades 72 of the second stage by way of steam feeding passages 67 to cool the second-stage moving blades 72. Thereafter, the cooling steam 80 reaches a cavity 69 by way of steam recovering passages 68. Further, another part of the cooling steam 80 flows into steam feeding passages 91 by way of a cavity 90 to enter the moving blades 71 of the first stage for cooling the interior of these moving blades. Thereafter, the steam reaches the cavity 69 by way of steam recovering passages 92. Thus, within the cavity 69, the flows of the steam recovered after cooling of the first-stage moving blades 71 and the second-stage moving blades 72 join together to enter another cavity 93. Thereafter, the steam flows through a center passage of the rotor 60 to be recovered at the side of the turbine shaft 64. Additionally, a part of the steam flowing through the steam passage 62 is supplied to the compressor 50 as well by way of a cavity 94 to be used for cooling the compressor 50. At this juncture, it should be mentioned that each of the steam passages 62 and 63 may defined by a pipe.

As is apparent from the above description, the conventional steam cooling system is so designed that the steam of low temperature and high pressure flows through the passages implemented internally of the rotor. Consequently, there are many locations where the steam leakage may occur to the external low-pressure environment, giving rise to a serious problem in the steam cooling system with regards to prevention of the leakage of the feed steam, i.e., steam to be fed to the moving blades of the gas turbine.

FIGS. 11 and 12 are sectional views showing fragmentally another example of the conventional gas turbines in which the steam cooling system is adopted. More specifically, FIG. 11 shows a rear portion of a fourth stage of moving blades in the conventional gas turbine. Referring to the figures, a rear disk (journal bearing) 102 is mounted onto a fourth-stage disk 100 through interposition of a seal disk 101, wherein an outer rotatable shaft 103 and an inner rotatable shaft 108 are mounted on the rear disk 102 so that the fourth-stage disk 100 can rotate together with the outer rotatable shaft 103 and the inner rotatable shaft 108. Rear end portions of the outer rotatable shaft 103 and the inner rotatable shaft 108 are enclosed by a stationary housing 104 which is disposed in opposition to both the rotatable shafts by means of a bearing portion 105 serving as a seal portion for the outer rotatable shaft 103 and a bearing portion 107 serving as a seal portion for the inner rotatable shaft 108. A high-pressure chamber 106 is defined between the rear end portion of the outer rotatable shaft 103 and the housing 104, while an annular steam passage 109 is defined between the outer rotatable shaft 103 and the inner rotatable shaft 108.

In the steam-cooling type gas turbine of the structure mentioned above, feed steam 120 (see FIG. 12) flows through the steam passage 109 from the high-pressure chamber 106 to enter an annular high-pressure chamber 110 from which the steam flows into a cavity 112 by way of a passage 111. From the cavity 112, the feed steam is introduced into the moving blades of the first and second stages (not shown either) via relevant passages (not shown) provided in the fourth-stage disk 100. The steam having done work of cooling the moving blades is recovered as the recovery-destined steam as indicated by an arrow 121 by way of a passage (not shown) formed in the inner rotatable shaft 108.

FIG. 12 is an enlarged view of the rear disk 102 shown in FIG. 11. Referring to FIG. 12, the portion of the rear disk 102 which lies adjacent to the seal disk 101 is heated by the recovery-destined steam 121 having a raised temperature and has a higher temperature than the other portion of the rear disk 102. Consequently, the portion of the rear disk 102 located adjacent to the seal disk is subjected to the influence of thermal expansion, as a result of which a disk coupling bolt 113 tends to be tilted under tension, as indicated by an arrow in FIG. 12. Consequently, a part 120a of the feed steam 120 will leak to the exterior through a clearance making appearance due to the tilting of the disk coupling bolt 113.

As is apparent from the foregoing description, in the typical steam-cooling type gas turbine known heretofore, the steam extracted from the steam turbine is introduced into the moving blades of the gas turbine via the disks from a plurality of steam passages provided internally of the rotor for cooling the moving blades. The steam heated to a high temperature after cooling of the moving blades is collected into the steam collecting cavity and fed to the center passage formed in the rotor, from which the steam is recovered to be fed back to the steam turbine. Owing to such cooling scheme effective utilization of the steam can certainly be achieved. However, with the conventional steamcooling system in which the steam of low temperature and high pressure is fed along the peripheral portion of the rotor, there exist many locations where the steam can leak to the ambient or environmental areas in the course of flowing toward the moving blades, which in turn means that an increased number of seal portions have to be provided in order to prevent such leakage of the feed steam. In other words, in the conventional steam-cooling type gas turbine, it remains as an important problem to be solved by what measures the leakage of the feed steam of high pressure to the environment of low pressure can be prevented.

Furthermore, in the conventional steam cooling system shown in FIG. 12, the rear disk (journal bearing) 102 is heated to a high temperature because the rear disk 102 is exposed to the recovery-destined steam 121 passing through the coupling portion interposed between the rear disk 102 and the rotor disk, as a result of which the rear disk or journal bearing 102 undergoes thermal deformation such that the outer peripheral portion thereof becomes apertured or opened to allow a part 120a of the feed steam 120 to leak therethrough. Besides, there arises a problem that an excessively large tensile stress may be induced in the disk coupling bolt 113 due to the thermal deformation mentioned above. Additionally, since the feed steam 120 flows at the radially outer side of the recovery-destined steam 121, steam leakage may occur through the bearings 105 and 107 serving as the stationary seals for the outer rotatable shaft 103, which will of course incur reduction in the amount of the feed steam to be supplied to the moving blades.

SUMMARY OF THE INVENTION

In the light of the state of the art described above, it is a primary object of the present invention to provide a steam-cooling type gas turbine which is structured such that leakage of the feed steam being supplied or fed to the moving blades of the gas turbine can be suppressed to a possible minimum and that elongation due to the thermal deformation can be easily absorbed to thereby prevent occurrence of aperture or clearance due to the thermal deformation and hence reduce the leakage of the feed steam while enhancing the steam recovery efficiency.

In view of the above and other objects which will become apparent as the description proceeds, the present invention is directed to a steam-cooling type gas turbine which includes a turbine shaft for supporting plural stages of disks and plural stages of moving blades, a first steam feeding passage formed internally of the turbine shaft so as to feed steam from a rear end side of the turbine shaft along an axial direction thereof, a plurality of second steam feeding passages for introducing the steam into the disks from the first steam feeding passage to thereby feed the steam to the moving blades for cooling thereof, first steam recovering passages formed in the disks, respectively, so as to receive and recover the steam after cooling of the individual moving blades, and a second steam recovering passage provided internally of the turbine shaft in communication with the first steam recovering passages, respectively, so as to recover the steam after cooling of the moving blades. According to a general aspect of the present invention, it is taught that the first steam feeding passage is so provided as to extend through a center portion of the turbine shaft, while the second steam recovering passages are so provided as to extend along the outer periphery of the first steam feeding passage.

With the structure of the steam-cooling type gas turbine described above, the feed steam for cooling the moving blades flows through a center portion of the turbine shaft. To say in another way, the feed steam flows at the radially inner side of the steam recovering passage. Thus, the leakage of the feed steam to the ambient or external environment can be diminished. In this conjunction, it should be recalled that in the case of the conventional steam-cooling type gas turbine, feeding or supply of the coolant steam is effected at the outer side of the turbine shaft while the recovery of the steam being realized through the passage formed internally of the turbine shaft, as a result of which a large amount of the feed steam may leak through the seal portions constituted by the stationary seal and the rotatable seal, incurring a significant leakage of the steam to be fed to the moving blades of the gas turbine. By contrast, in the steam-cooling type gas turbine implemented in the structure according to the invention, as described above, the steam for cooling the moving blades is supplied along a flow path defined at the radially inner side of the steam recovering passage, which is very effective for suppressing or preventing positively the leakage of the feed steam in the seal portions.

In a preferred mode for carrying out the invention, the steam-cooling type gas turbine may further include a plurality of recesses provided so as to extend in a radial direction in a coupling portion interposed between the final-stage disk and the turbine shaft, wherein the second steam feeding passages are interconnected to the first steam feeding passage by way of the above-mentioned recesses, and third steam recovering passages provided in the turbine shaft at a rear side of the coupling portion so as to extend in a radial pattern, wherein the first steam recovering passages and the second steam recovering passages are interconnected by way of the third steam recovering passages.

With the structure mentioned above, the steam recovering passage is disposed at a location downstream of the coupling portion between the disk and the turbine shaft. Thus, there can be realized a flow path structure for the feed steam (i.e., steam fed for cooling the moving blades) such that the coupling portion interposed between the disk and the turbine shaft can remain at a relatively low temperature because the steam receiving passage is disposed downstream of the coupling portion. Thus, the coupling portion between the disk and the turbine shaft can so deform under the influence of the thermal stress as to be hermetically more closed, whereby leakage of the steam through the coupling portion can be prevented or suppressed satisfactorily. In this conjunction, it should be recalled that in the case of the conventional steam-cooling type gas turbine, the temperature of the coupling portion becomes high because the recovery-destined steam of high temperature flows along the coupling portion, resulting in that the coupling portion tends to be apertured or opened under the thermal deformation. Occurrence of such aperture at the coupling portion can be positively prevented in the structure according to the invention mentioned above.

In another preferred mode for carrying out the invention, a thermal shield cylinder may be mounted on an inner peripheral wall defining outer peripheries of the second steam recovering passages with a predetermined space being held relative to the inner peripheral wall.

In this case, the space mentioned above may be filled with steam and/or air to form a gas layer for suppressing heat conduction to the bearings from the steam with a view to protecting lubricant oil against burning and deposition.

In yet another preferred mode for carrying out the invention, the steam-cooling type gas turbine may further include a seal portion connected to the second steam recovering passage at a rear end thereof and forming a part of the second steam recovering passage, wherein the seal portion is constituted by a rotatable cylindrical seal member having a plurality of fins formed in the outer peripheral surface thereof and a stationary cylindrical seal member enclosing the rotatable cylindrical seal member and having a plurality of fins formed in the inner peripheral surface thereof in opposition to the fins of the rotatable cylindrical seal member, and a cylindrical centering member for securing together the rotatable cylindrical seal member and a rear end portion of the first steam feeding passage.

By implementing the seal portion with the rotatable cylindrical seal member and the stationary cylindrical seal member as mentioned above, the seal can be realized with high reliability while assembling of the cylindrical centering member can be much facilitated.

In still another preferred mode for carrying out the invention, the steam-cooling type gas turbine may further include a plurality of supporting members provided between the inner peripheral surface of the second steam recovering passage and the outer peripheral surface of the first steam feeding passage with a predetermined distance being held between the adjacent ones of the supporting members in the circumferential direction, wherein both end portions of the first steam feeding passage are slidable in the axial direction.

Owing to the structure described above, expansion of the inner cylindrical member due to the thermal deformation can be appropriately coped with.

In a further preferred mode for carrying out the invention, the steam-cooling type gas turbine may be so arranged as to include at least one annular groove formed in and along an outer periphery of the first steam feeding passage between a front end portion of the first steam feeding passage and the turbine shaft, and a piston ring fit within the groove.

With the arrangement described above, it is possible to prevent leakage of the feed steam into the steam recovering passage formed internally of the turbine shaft. Further, by realizing the piston ring to be movable upon thermal expansion in the axial direction, the thermal expansion can be absorbed satisfactorily.

In yet further preferred mode for carrying out the invention, each of the second steam feeding passages and the first steam recovering passages may be constituted by a steam feeding pipe and a steam recovering pipe, respectively, which are inserted into pipe receiving holes formed so as to extend through the disks at the plural stages, respectively, wherein each of the pipes is previously applied with a tension load in a direction from an upstream side to a downstream side. Besides, the tension load can be sustained by engaging a sleeve member fit into the upstream tip end portion of the pipe with an outer side surface of the first-stage disk at an upstream side thereof.

Owing to the arrangement described above, the pipe can easily be removed by simply detaching the sleeve member, which is very advantageous for inspection and/or exchange of the pipe.

In still further preferred mode for carrying out the invention, a concave/convex portion may be formed in an upstream tip end portion of each of the pipes, and the sleeve member may be split into two halves in a circumferential direction along a longitudinal axis and include a cylindrical body portion having a concave/convex portion fit to the first mentioned concave/convex portion and a flange portion extending radially outwardly from an outer end of the cylindrical body portion of the sleeve to engage the outer side surface of the first-stage disk at an upstream side thereof.

With the structure described above, the sleeve member and the pipe can be easily engaged and disengaged. Besides, the pipe can be mounted securely through engagement of the concave/convex portions. Additionally, because the concave/convex portions engage each other at plural locations, concentration of stress can be evaded, to another advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
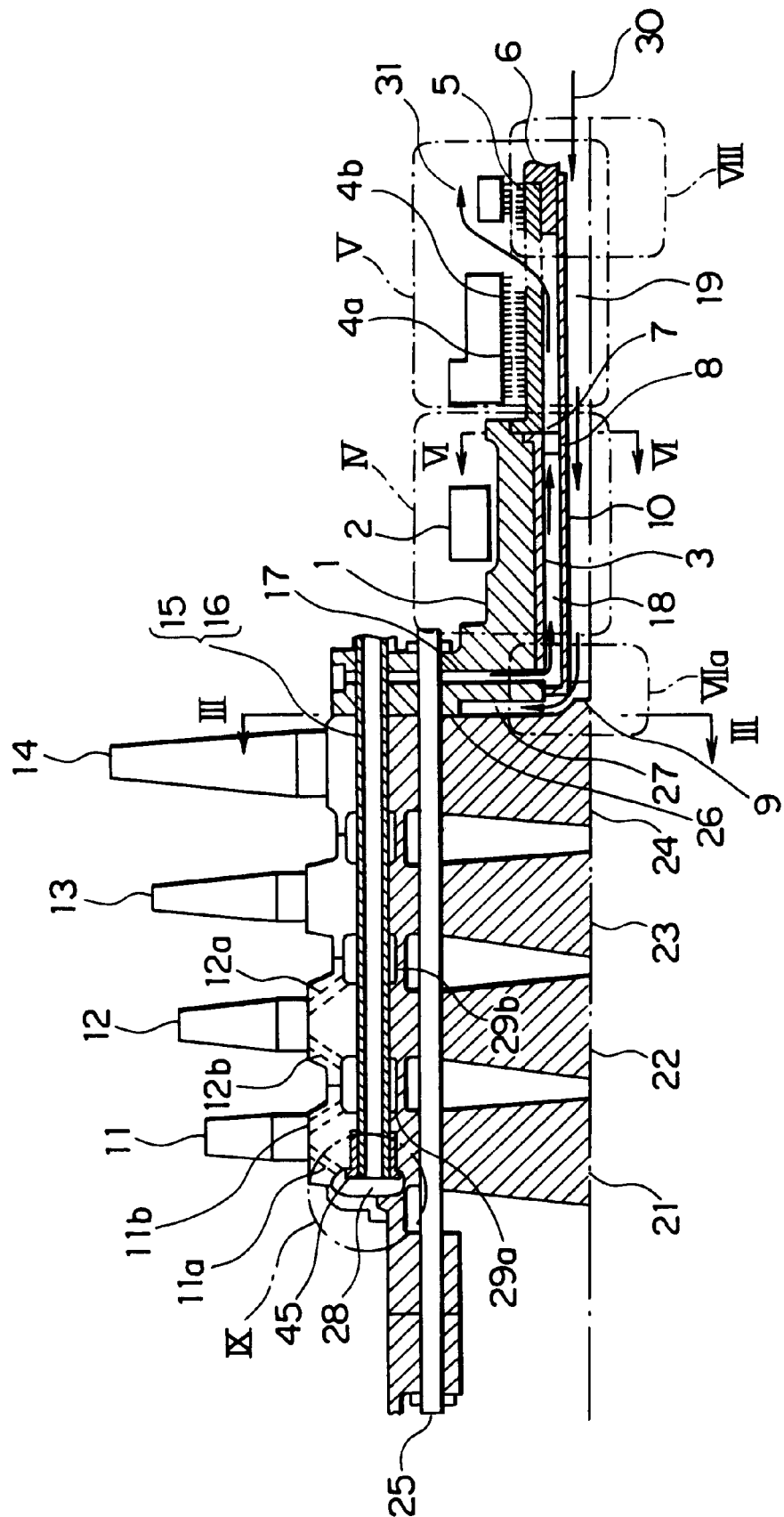
FIG. 1 is a sectional view showing a major portion of a steam-cooling type gas turbine according to an exemplary embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "right", "left", "front", "rear" and the like are words of convenience and are not to be construed as limiting terms.

FIG. 1 is a sectional view showing a major portion of a steam-cooling type gas turbine according to a preferred or exemplary embodiment of the present invention. Referring to the figure, mounted on disks 21, 22, 23 and 24 disposed with distance therebetween in an axial direction of a turbine rotor of the gas turbine are a first stage of moving blades 11, a second stage of moving blades 12, a third stage of moving blades 13 and a fourth stage of moving blades 14, respectively, wherein in each of the moving blade stages mentioned above, a plurality of moving blades are mounted on the relevant disk with an equidistance therebetween in a circumferential direction. The disks 21, 22, 23 and 24 and a turbine shaft 1 are mutually coupled by means of disk coupling bolts 25 extending in the axial direction.

The turbine shaft 1 is provided with a coupling portion 26 at one end thereof as viewed in the axial direction. Through the medium of the coupling portion 26, the turbine shaft 1 is so mounted as to bear against the fourth-stage disk 24. Further, the turbine shaft 1 is supported rotatably by oil-sealed bearing means 2 illustrated only schematically. A cavity 27 is formed between the fourth-stage disk 24 and the turbine shaft 1. Mounted internally of the turbine shaft 1 of a hollow structure is a cylindrical thermal shield 3, wherein an outer cylindrical seal 5 is mounted on the end faces of the thermal shield 3 and the turbine shaft 1 by means of coupling bolts 7 so as to extend in the axial direction. Additionally, an inner hollow cylindrical member 10 is disposed within the turbine shaft 1 at an inner side relative to the thermal shield 3 and the outer cylindrical seal 5, wherein a centering piece 6 is fitted into an annular space defined between the outer cylindrical seal 5 and the inner hollow cylindrical member 10. In this manner, the outer cylindrical seal 5 is fixedly secured to the inner hollow cylindrical member 10 through the medium of the centering piece 6. Disposed around the outer cylindrical seal 5 are a stationary seal fin assembly 4a and a rotatable seal fin assembly 4b in opposition to each other.

Figure 6:
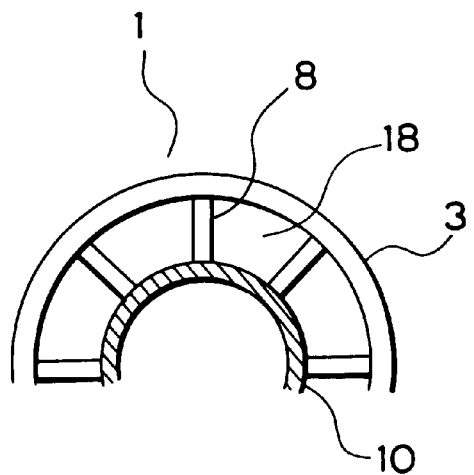
FIG. 6 is a sectional view taken along a line VI—VI and viewed in the direction indicated by arrows in FIG. 1.

Furthermore, strut supports 8 are disposed at appropriate positions between the thermal shield 3 and the inner hollow cylindrical member 10 so as to ensure an annular space defined between the thermal shield 3 and the inner hollow cylindrical member 10 (see FIG. 6). Further strut supports 9 are mounted axially slidably at an end portion of the inner hollow cylindrical member 10 adjacent to the cavity 27 (see FIG. 7(b)).

Figure 2:
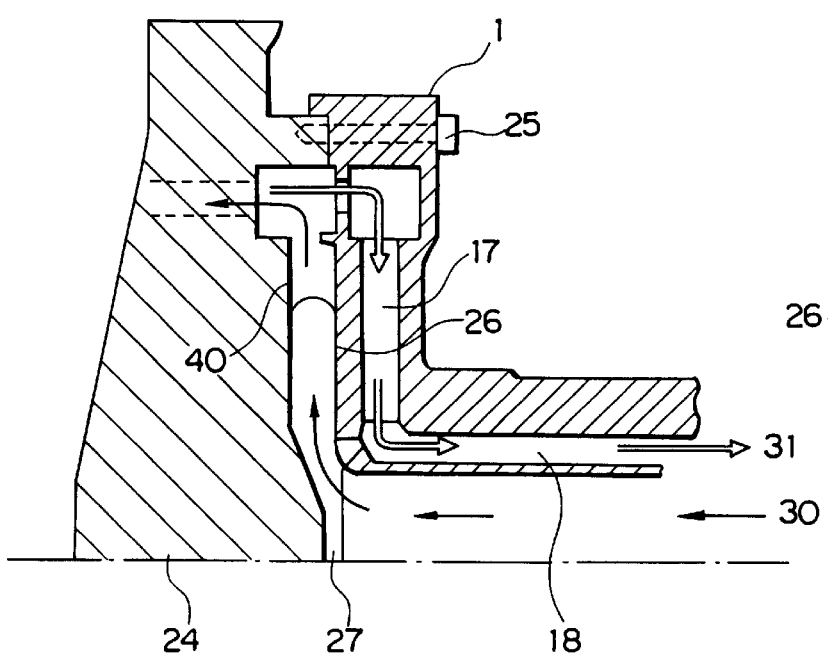
FIG. 2(a) is a view showing in detail a coupling portion provided between a turbine shaft and a disk in the steam-cooling type gas turbine shown in FIG. 1.
FIG. 2(b) is a view for illustrating deformation of the coupling portion due to thermal stress induced therein.
Figure 2:
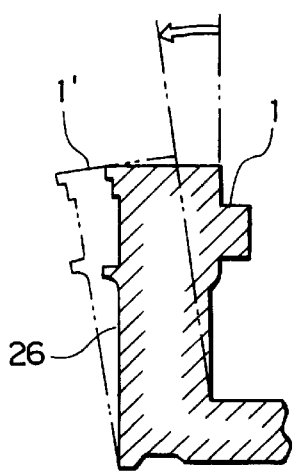

Each of the first-stage moving blades 11 is provided with a steam feeding passage 11a and a steam recovering passage 11b Similarly, each of the second-stage moving blades 12 is provided with a steam feeding passage 12a and a steam recovering passage 12b. As will be described hereinafter by reference to FIGS. 2 and 3, each of the steam feeding passages 11a and 12a is communicated with each of steam feeding passages 15 formed in the disk (see FIG. 3). Similarly, each of the steam recovering passages 11b and 12b is communicated to each of steam recovering passages 16 formed in the disk (see FIG. 3). The steam feeding passage 15 is communicated to a recess formed in the coupling portion 26 and hence to the cavity 27 which is fluidly connected to an axial steam-feeding passage 19, as will be described hereinafter. On the other hand, each of the steam recovering passages 16 is communicated to radial steam-recovering passages 17 which extend in the radial direction and fluidly connected to an axial steam-recovering passage 18, as can be seen in FIGS. 1 and 2. The steam feeding passage 15 and the steam recovering passage 16 are formed by a steam feeding pipe and a steam recovering pipe, respectively, which are inserted into the disks, as can be seen in FIG. 1. Moreover, the second steam feeding passages 15 and the first steam recovering passages 16 pass through substantially radially intermediate portions of each disk 21–24, respectively, and are annularly aligned on a single circle at each disk 21–24, respectively, as shown as FIGS 1 and 3.

Figure 3:
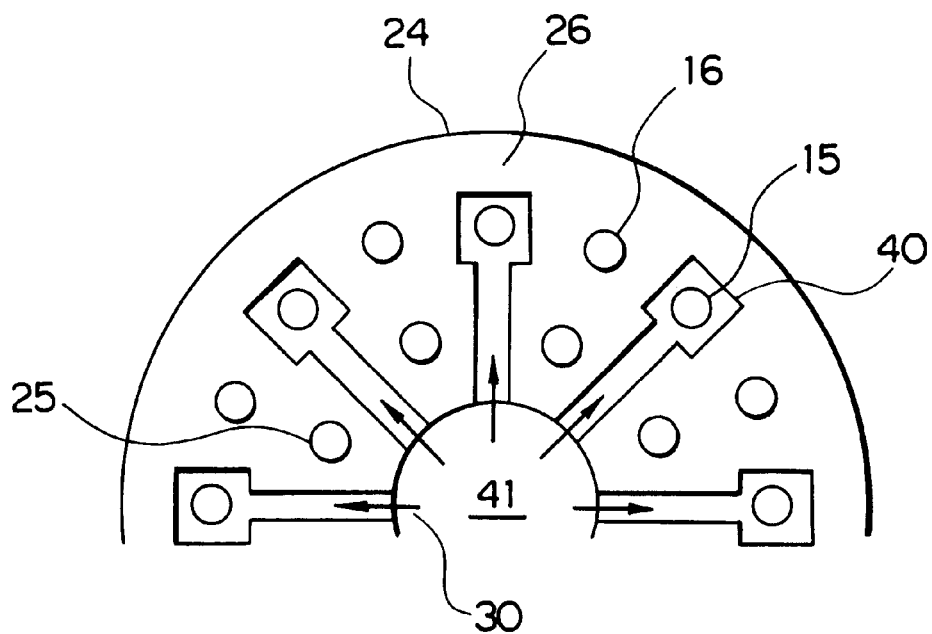
FIG. 3 is a sectional view taken along a line III—III shown in FIG. 1 for illustrating flows of feed steam.

Thus, steam feeding cavities 28 and 29b formed at the inner side of the turbine moving blades 11 and 12, respectively, and the hollow turbine shaft 1 are interconnected by the steam feeding pipes 15, while the steam recovering cavities 29a formed at the inner side of the turbine moving blades 11 and 12 and the hollow turbine shaft 1 are interconnected by the steam recovering pipes 16, wherein sleeves 45 are disposed at tip end portions of the steam feeding pipes 15 and the steam recovering pipes 16, respectively. Parenthetically, the steam feeding pipes 15 and the steam recovering pipes 16 are inserted into the rotor from the right side to the left side, as viewed in FIG. 1, i.e., from the downstream side to the upstream side, at predetermined positions distanced angularly in the circumferential direction of the rotor such that the steam feeding pipes 15 and the steam recovering pipes 16 are disposed alternately in the circumferential direction of the rotor, being angularly displaced from one another, as can be seen in FIG. 3. However, in FIG. 1, the steam feeding pipe 15 and the steam recovering pipe 16 are shown as being superposed for convenience of illustration.

Upon starting of the gas turbine operation, differences in the thermal expansion make appearance between the steam feeding pipe 15 and the steam recovering pipe 16 on one hand and the disks 21, 22, 23 and 24 on the other hand. Accordingly, in order to absorb such differential thermal expansion, each of the steam feeding pipes 15 and the steam recovering pipes 16 is mounted, being previously stretched by a length corresponding to the above-mentioned difference in the thermal expansion relative to the natural length thereof by applying a tension load 46 to each of the steam feeding pipes 15 and the steam recovering pipes 16 in the axial direction (see FIG. 9) upon assembling of the gas turbine.

In the steam-cooling type gas turbine of the structure described above, the feed steam 30 (i.e., steam fed to the moving blades for cooling thereof) enters the cavity 27 via the inner space of the inner hollow cylindrical member 10 (see FIG. 2) and then flows from the cavity 27 into the steam feeding pipes 15 by way of the recesses formed in the abutting surface of the coupling portion 26 of the turbine shaft 1. Subsequently, the feed steam flows through the steam feeding pipes 15 to enter the cavity 28 formed in the disk 21 on which the first-stage moving blades 11 are mounted and hence to the interiors of the first-stage moving blades 11 via the steam feeding passage 11a (see FIG. 1) to flow through a coolant steam passage (not shown) formed in each of the moving blades 11. Thereafter, the steam enters the cavity 29a provided between the disks 21 and 22 via the steam recovering passages 11b (see FIG. 1). A part of the steam flows out from the cavity 29a into the steam recovering pipe 16.

Further, the steam fed through the steam feeding pipes 15 also flows into a cavity 29b provided between the disks 22 and 23 to enter the interiors of the second-stage moving blades 12 by way of the steam feeding passage 12a formed in the disk 22. Thereafter, the steam flows through a coolant steam passage (not shown) formed internally of each moving blade 12 to enter the cavity 29a via the steam recovering passage 12b. The steam flows out from the cavity 29a into the steam recovering pipe 16 together with the above-mentioned recovery-destined steam flowing out from the first-stage moving blades 11.

Figure 5:
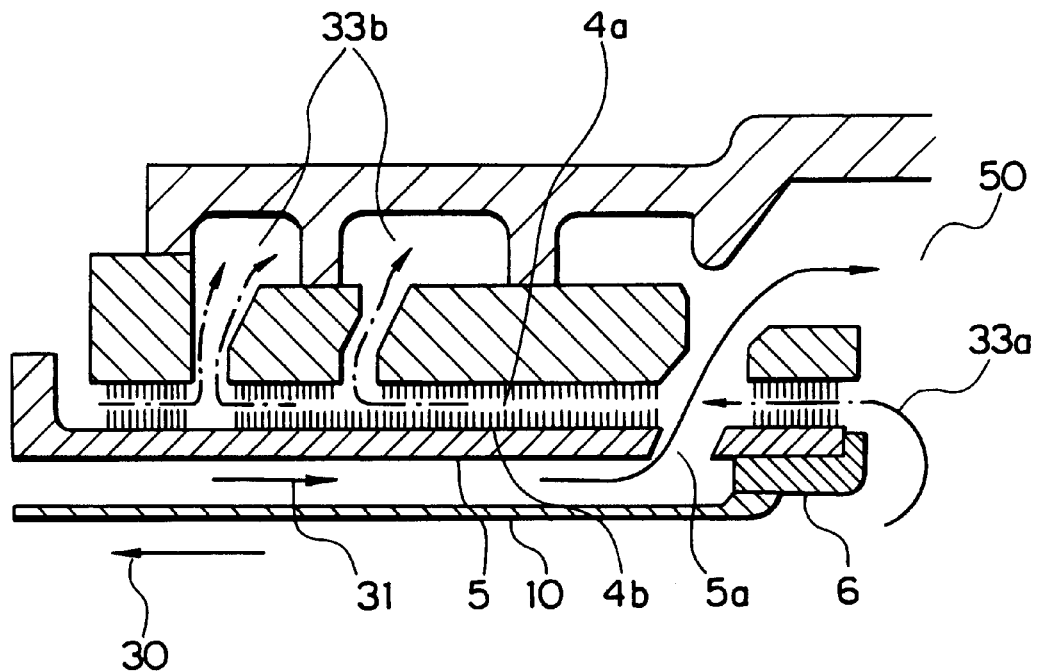
FIG. 5 is a view showing in detail a rectangular region enclosed by a broken line V in FIG. 1.

The recovery-destined steam leaving the steam (i.e., steam to be recovered after having done work of cooling moving blades) recovering pipes 16 flows through the radial steam-recovering passages 17 radially inwardly and then flows through the axial steam-recovering passage 18 to enter the externally provided compressor 50 through outlet openings 5a formed in the outer cylindrical seal 5, as shown in FIG. 5, to be thereby recovered by a steam recovering system (not shown). With the structure of the steam-cooling type gas turbine according to the instant embodiment of the invention, the feed steam 30 is supplied to the moving blades from the location nearer to the center of the rotor than the flow path of the recovery-destined steam, and thus the recovery-destined steam is recovered at the location distanced radially externally from the center of the rotor more than the flow path of the feed steam. In other words, the flow paths of the feed steam and the recovery-destined steam are positionally reversed when compared with those in the conventional steam-cooling type gas turbines described hereinbefore. Owing to such structural feature of the steam-cooling type gas turbine according to the instant embodiment of the invention, external leakage of the feed steam can be suppressed more positively, the reason for which will be elucidated below in more detail.

FIG. 2 are views showing in detail the coupling portion of the turbine shaft 1 shown in FIG. 1, wherein FIG. 2(a) is a sectional view of the coupling portion and FIG. 2(b) is a view for illustrating deformation of the same due to thermal stress induced therein. Referring to FIG. 2(a), the fourth-stage disk 24 and the turbine shaft 1 are brought into contact with each other through the medium of the interposed coupling portion 26 and secured together by means of a plurality of disk coupling bolts 25. Needless to say, the feed steam 30 serves as a coolant steam and has a relatively low temperature. The feed steam 30 is supplied to the moving blades by way of recesses 40 formed in the coupling portion 26 (see FIG. 3).

Figure 7:
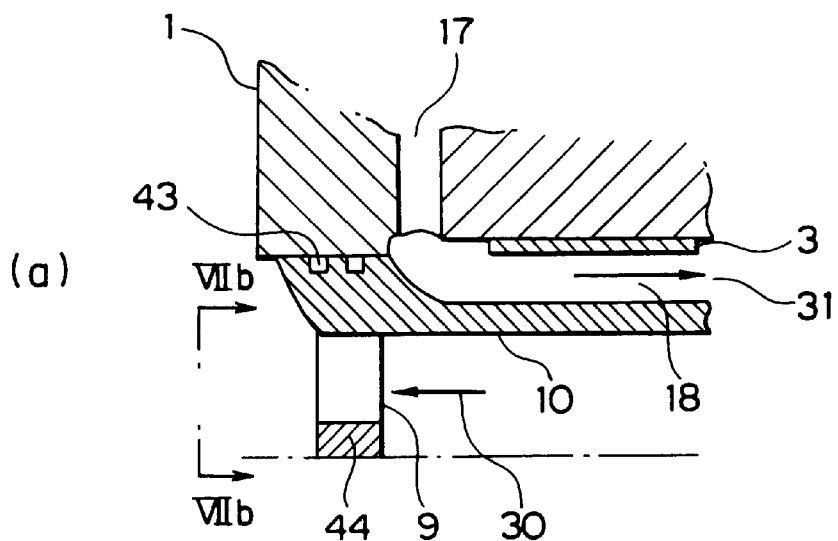
FIG. 7(a) is an enlarged sectional view of a region indicated as enclosed by a broken line VIIa in FIG. 1.
FIG. 7(b) is a sectional view taken along a line VIIb—VIIb and viewed in the direction indicated by arrows in FIG. 7(a)
Figure 7:
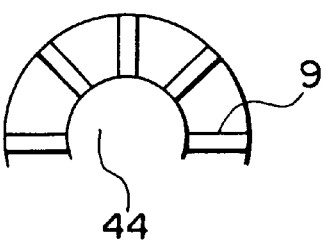
Figure 12:
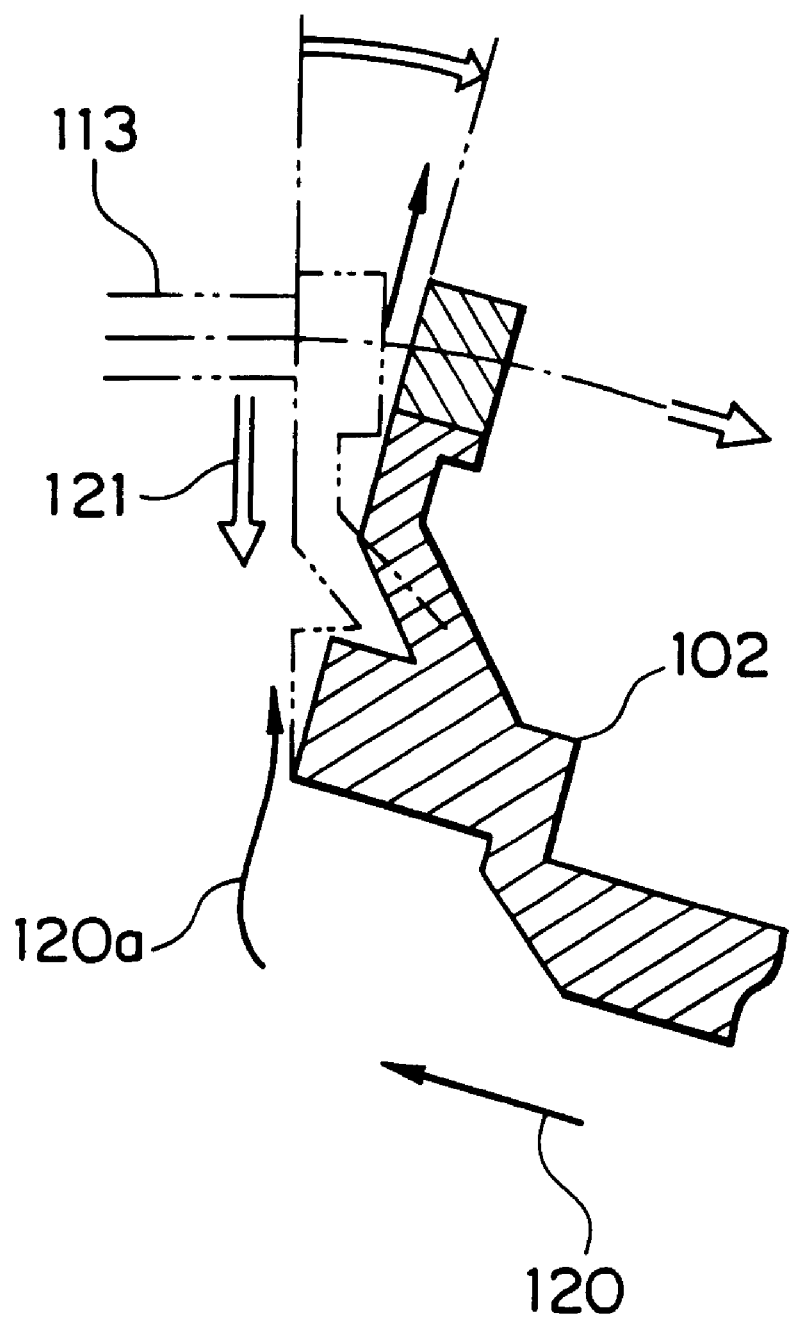
FIG. 12 is a view for illustrating thermal deformation of a coupling portion provided between a turbine shaft and a disk in the steam-cooling type gas turbine shown in FIG. 11.
Figure 13:
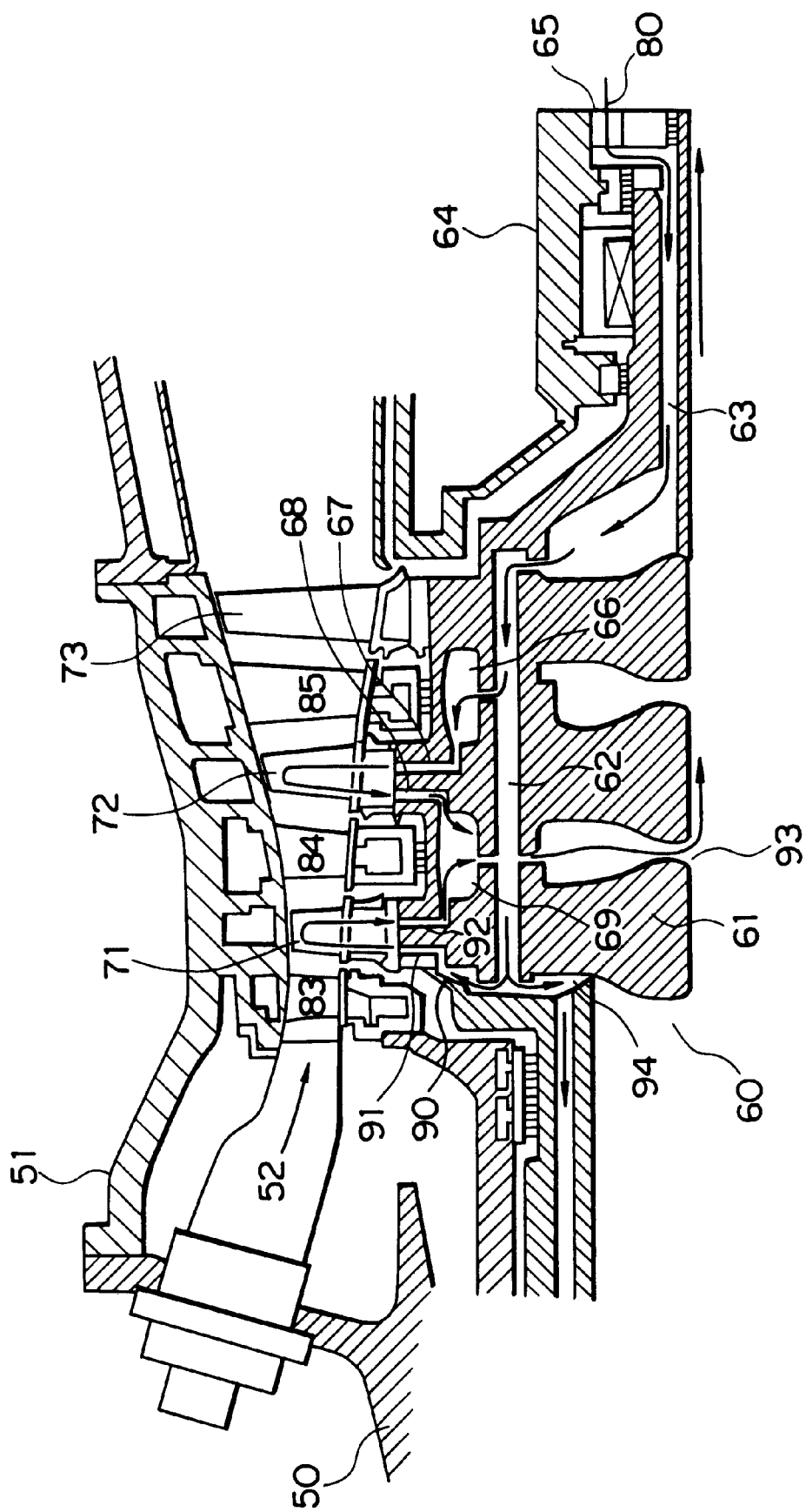
FIG. 13 is a sectional view showing fragmentarily another example of the conventional gas turbines.

On the other hand, the recover-destined steam 31 having temperature raised by depriving the moving blades of heat upon cooling thereof is recovered from the fourth-stage disk 24 to the axial steam-recovering passage 18 by way of the radial steam-recovering passages 17 formed in the turbine shaft 1 (see FIG. 7). Consequently, temperature at the portion of the turbine shaft 1 located adjacent to the coupling portion 26 becomes low while the interior of the turbine shaft 1 assumes high temperature, as a result of which a force indicated by an arrow in FIG. 2(b) acts on the turbine shaft under the thermal expansion to thereby deform the turbine shaft in the direction in which the cavity 27 is hermetically closed, as indicated by reference symbol 1'. To say in another way, the tendency of the coupling portion to become apertured due to the thermal stress, as in the case of the conventional steam-cooling type gas turbine described hereinbefore by reference to FIG. 12, can be positively suppressed, whereby leakage of the feed steam can be prevented more positively.

FIG. 3 is a sectional view taken along a line III—III shown in FIG. 1 and FIG. 2(a). It can be seen that the recesses 40 are radially provided in the coupling portion 26 of the fourth-stage disk 24. These recesses 40 are communicated with the steam feeding pipes 15, respectively, which extend in the axial direction. Between the adjacent steam feeding pipes 15, there are provided a pair of steam recovering pipes 16 spaced away in the radial direction, wherein the radially inner recovery pipe and the radially outer recovery pipe in each pair are disposed coaxially (see FIG. 3). The feed steam 30 enters the recesses 40 from a through-hole 41 formed axially in the rotor at a center portion thereof to flow radially into the steam feeding pipes 15 to be fed to the moving blades. The recovery-destined steam 31, i.e., the steam having been utilized for cooling the moving blade, is recovered through radial steam-recovering passages (not shown) formed in the turbine shaft 1 by way of the steam recovering pipes 16 shown in FIG. 3.

Figure 4:
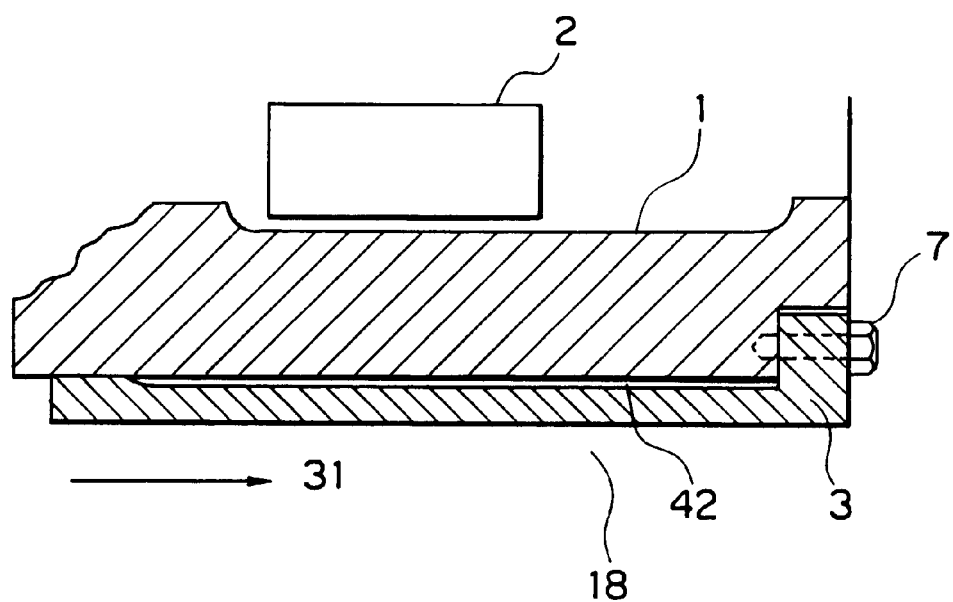
FIG. 4 is a view showing in detail a rectangular region enclosed by a broken line IV in FIG. 1.

FIG. 4 is a view showing in detail a region IV in FIG. 1. As can be seen in the figure, the cylindrical thermal shield 3 is mounted between the turbine shaft 1 and the axial steam-recovering passage 18 and fixedly secured by means of the coupling bolts 7, whereby an annular space 42 is defined between the outer peripheral surface of the thermal shield 3 and the inner peripheral surface of the turbine shaft 1. This annular space 42 serves to form a gas layer of steam or air which can prevent heat of the recovery-destined steam 31 of high temperature from conduction to the bearing 2 of the turbine shaft 1.

FIG. 5 is a view showing in detail a region V shown in FIG. 1. As can be seen in FIG. 5, the centering piece 6 is mounted at the rear end side of the inner hollow cylindrical member 10. Further, the outlet openings 5a are formed in the outer cylindrical seal 5 so that the recovery-destined steam 31 can flow out through the through-holes to be recovered to a ground steam header by way of a piping (not shown) for reutilization of the steam within the plant.

The rotatable seal fin assembly 4b is disposed on the outer side of the outer cylindrical seal 5 in opposition to the stationary seal fin assembly 4a, wherein the stationary and rotatable seal fin assemblies 4a and 4b constitute stationary and rotatable seals, respectively. A part of the feed steam 30 escapes as a steam leakage 33a through the seal portion. However, all the steam leakages indicated by arrows 33b are collected to the passage (50) which is communicated to the aforementioned ground steam header to be thereby recovered, advantageously for the effective reutilization of the steam.

FIG. 6 is a sectional view taken along a line VI—VI and viewed in the direction indicated by arrows in FIG. 1. It can be seen that the annular axial steam-recovering passage 18 is formed between the thermal shield 3 mounted on the turbine shaft 1 and the inner hollow cylindrical member 10 and that the axial steam-recovering passage 18 is secured by disposing a plurality of strut supports 8 between the thermal shield 3 and the inner hollow cylindrical member 10.

FIG. 7(a) is an enlarged sectional view of a region VIIa shown in FIG. 1, and FIG. 7(b) is a sectional view taken along a line VIIb—VIIb in FIG. 7(a) and viewed in the direction indicated by arrows shown therein. As can be seen in FIG. 7, a plurality of annular grooves are formed in an end portion of the inner hollow cylindrical member 10, wherein annular piston rings 43 are slidably disposed in the grooves so as to abut on the inner peripheral surface of the turbine shaft 1 at an end portion thereof. In this manner, seal is realized for preventing the leakage of the steam from the connecting portion of the merging portion of the axial steam-recovering passage 18 and the radial steam-recovering passage 17. Furthermore, in order to introduce the feed steam 30 into the recesses 40 described hereinbefore in conjunction with FIG. 3, a large number of strut supports 9 are provided at the inner end portion of the inner hollow cylindrical member 10 in the circumferential direction with distance between the strut supports 9 while a solid cylindrical axial member 44 is disposed at the inner center portion of the inner hollow cylindrical member 10, as shown in FIG. 7(b). Thus, even when the inner hollow cylindrical member 10 is heated by the recovery-destined steam 31 of relative high temperature from the outer side and undergoes thermal expansion in the axial direction, the inner hollow cylindrical member 10 can move relative to the turbine shaft 1 because the piston rings 43 provided at the outer peripheral end portion of the inner hollow cylindrical member 10 are slidable in the axial direction. In this way, thermal expansion of the tip end portion of the inner hollow cylindrical member 10 is made permissible.

Figure 8:
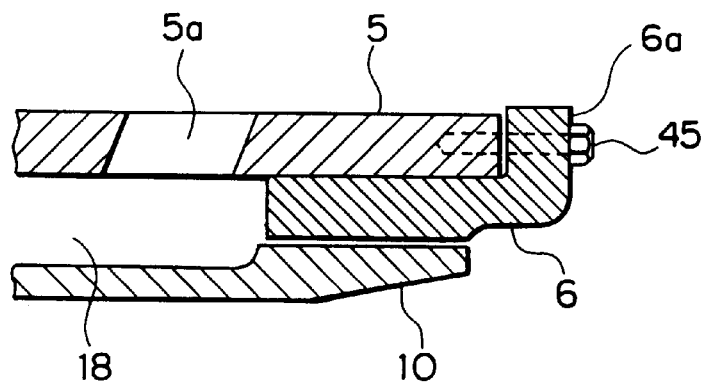
FIG. 8 is a view showing in detail a region indicated as surrounded by a broken line VIII in FIG. 1.

FIG. 8 is a view showing in detail a region surrounded by a broken line VIII in FIG. 1. As can be seen in the figure, the sleeve-like centering piece 6 mentioned previously is inserted between the outer cylindrical seal 5 and the inner hollow cylindrical member 10, wherein the flange portion 6a of the centering piece 6 is secured to a tip end portion of the outer cylindrical seal 5 by means of the bolt 45. The centering piece 6 permits the inner hollow cylindrical member 10 to move slidably in the axial direction relative to the centering piece 6 and at the same time serves as a seal for the tip end portion of the axial steam-recovering passage 18. By virtue of such arrangement, thermal expansion can be afforded in the tip end portion of the inner hollow cylindrical member 10 as well.

Figure 9:
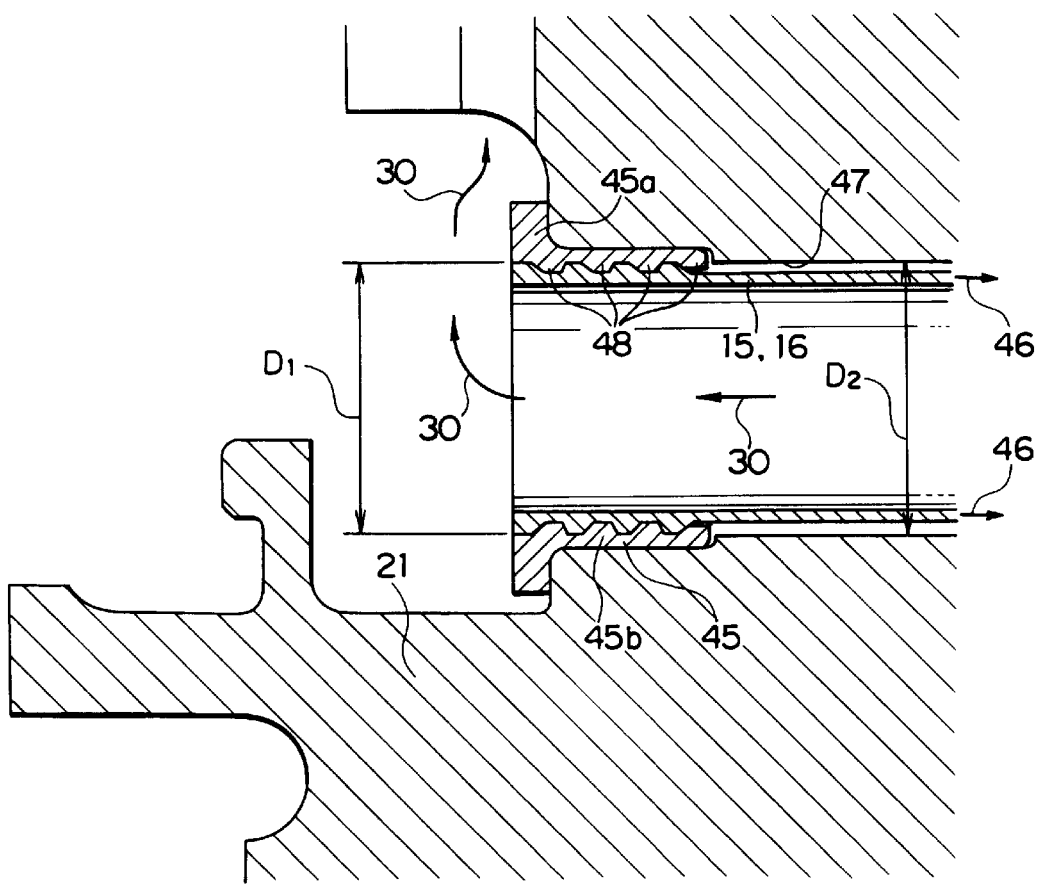
FIG. 9 is an enlarged sectional view of a region IX shown in FIG. 1, showing a major portion in a tip end portion of a steam feeding pipe or a steam recovering pipe provided in the steam-cooling type gas turbine shown in FIG. 1.
Figure 10:
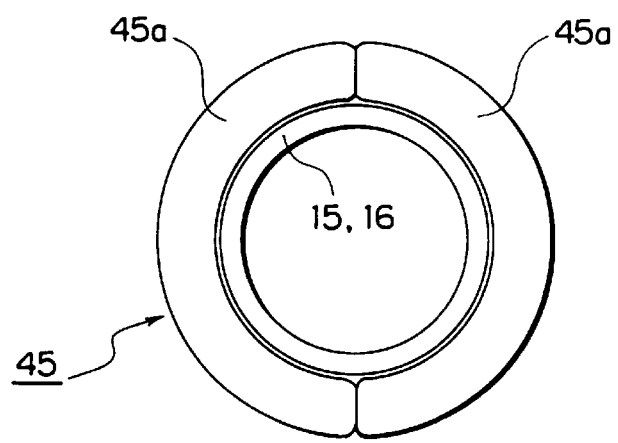
FIG. 10 is a cross-sectional view of the tip end portion of the steam feeding pipe or the steam recovering pipe shown in FIG. 9.
Figure 11:
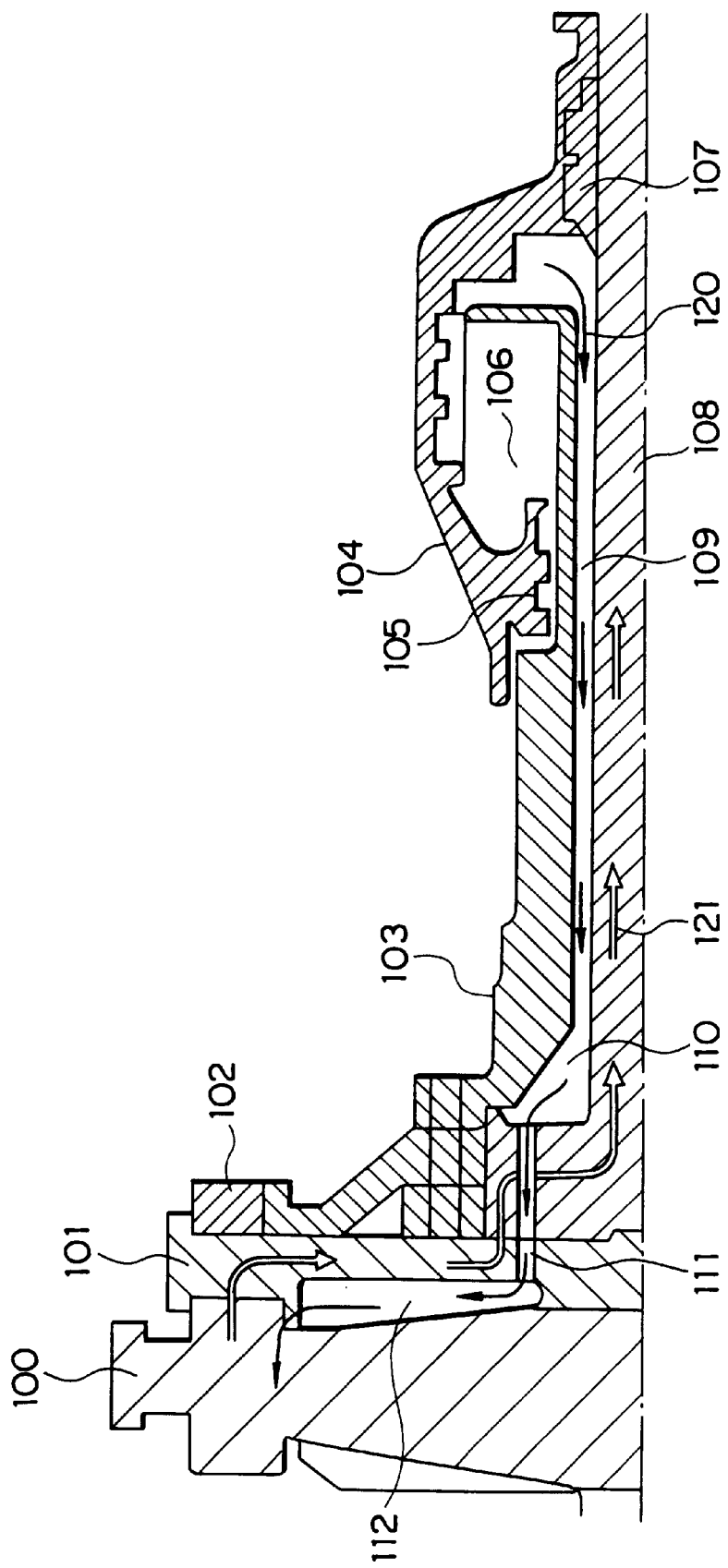
FIG. 11 is a sectional view showing, by way of example, a portion of a fourth-stage disk for moving blades in a conventional gas turbine.

Now, referring to FIG. 1, FIG. 9 and FIG. 10, description will be directed to the tip end portion structures of the steam feeding pipe 15 and the steam recovering pipe 16. As can be seen in FIG. 9, the maximum outer diameters $D_1$ of the steam feeding pipe 15 and the steam recovering pipe 16 is dimensioned substantially smaller than the minimum outer diameter $D_2$ of pipe receiving holes 47 formed in the rotor disks 21, 22, 23 and 24 with a same diameter so that the steam feeding pipe 15 and the steam recovering pipe 16 can be inserted from the rear side of the rotor as described hereinbefore.

For sustaining the tension load 46 applied previously to the steam feeding pipe 15 and the steam recovering pipe 16, the sleeve 45 mentioned previously is fit onto the steam feeding pipe 15 and the steam recovering pipe 16 at the tip end portion thereof after having been inserted into the rotor, wherein the pipes 15 and 16 are supported by retaining the pipes 15 and 16 onto the rotor disk 21 by means of the flange portion 45a of the sleeves 45.

Next, referring to FIGS. 9 and 10, description will turn to the structure of the sleeve 45 in detail. The sleeve 45 is split into two halves (right and left halves, as viewed in FIG. 10) in the circumferential direction along the longitudinal axis of the rotor so that the sleeve 45 can be fit onto the steam feeding pipe 15 and the steam recovering pipe 16 from the front side of the rotor after the steam feeding pipe 15 and the steam recovering pipe 16 have been inserted into the respective holes. Further, a joint portion between the sleeve 45 and the pipe 15 or 16 is realized in a multi-contact supporting structure 48 in which the concave/convex portion is formed in the inner peripheral surface of a cylindrical body portion 45b of the sleeve 45 with a view to reducing the stress induced by the tension load 46 applied to the pipe. By virtue of such multi-contact supporting structure 48, the load to be shared by the individual concave/convex contact portions can be restricted. Such concave/convex contact portions may be realized in the form of threads. Furthermore, the cylindrical body portion 45b of the sleeve 45 may be configured so as to engage the inner periphery of the pipe at the upstream tip end portion instead of the outer periphery thereof.

With the structure of the steam-cooling type gas turbine according to the illustrated embodiment of the present invention in which the axial steam-recovering passage 18 is provided internally of the turbine shaft 1 at the radially outer side relative to the axial steam-feeding passage 19 provided at the radially inner side for thereby supply the feed steam 30 of relatively low temperature to be fed through the axial steam-feeding passage 19 while the steam of relatively high temperature is recovered through the axial steam-recovering passage 18 located at the outer side of the axial steam-feeding passage 19, leakage of the feed steam 30 to the exterior can be suppressed positively. Besides, owing to the arrangement that the recesses 40 serving as the passages for the feed steam 30 are provided in the coupling portion 26 interposed between the fourth-stage disk 24 constituting the final stage of the steam-cooling type gas turbine and the turbine shaft 1, the coupling portion 26 is forced to be closed hermetically under the action of thermal stress induced therein. Additionally, owing to the structure in which the thermal shield 3 is provided within the bore of the turbine shaft 1 so that a gas layer is formed within the annular space 42, conduction of heat to the bearing 2 from the recovery-destined steam 31 is difficult to occur, which is effective for preventing burning deposition of lubricant oil.

Furthermore, in the steam-cooling type gas turbine according to the illustrated embodiment of the invention, there are employed the strut supports 8 and 9 disposed at outer and inner sides, respectively, of the inner hollow cylindrical member 10 for securing the axial steam-recovering passage 18, the piston rings 43 disposed at one end portion of the inner hollow cylindrical member 10 and the centering piece 6 disposed at the outer end portion of the inner hollow cylindrical member 10. Owing to this feature, the inner hollow cylindrical member 10 can be fixed in the radial direction while allowed to slide in the axial direction to permit the tip end portion of the inner hollow cylindrical member 10. Besides, the use of the centering piece 6 can facilitate assembling of the gas turbine.

With regard to the seal between the stationary portion and the rotating portion of the gas turbine, seal is realized through cooperation of the stationary seal fin assembly 4a and the rotatable seal fin assembly 4b such that all the steam leakage 33b escaping from the feed steam flow 30 can be recovered to the ground steam header. Thus, the leaking steam can be recovered with high efficiency.

Additionally, by virtue of structure in which the steam feeding pipe 15 and the steam recovering pipe 16 are supported by the sleeve 45, as described hereinbefore, inspection and/or exchange of the steam feeding pipe 15 as well as the steam recovering pipe 16 can be carried out simply by removing the sleeve 45 without need for disassembling the gas turbine rotor as a whole. More specifically, the steam feeding pipe 15 and the steam recovering pipe 16 can be removed or mounted from the rear side of the rotor by removing the sleeve 45, the time period required for the maintenance of the steam feeding pipe 15 and the steam recovering pipe 16 can be significantly shortened.

In the foregoing, the present invention has been described in conjunction with the exemplary embodiments. However, the present invention is never restricted to these exemplary embodiments. It goes without saying that various alterations and modifications may be made as to the concrete structure or arrangement without departing from the scope of the invention.

What is claimed is:

1. A steam-cooling type gas turbine, comprising:
   a turbine shaft for supporting plural stages of disks and plural stages of moving blades;
   a first steam feeding passage formed internally of said turbine shaft so as to feed steam from a rear end side of said turbine shaft along an axial direction thereof;
   a plurality of second steam feeding passages for introducing the steam into said disks from said first steam feeding passage to thereby feed said steam to said moving blades for cooling thereof;
   first steam recovering passages formed in said disks, respectively, so as to receive and recover the steam after cooling of said individual moving blades; and
   a second steam recovering passage provided internally of said turbine shaft in communication with said first steam recovering passages, respectively, so as to recover the steam after cooling of said moving blades;
   wherein said first steam feeding passage is so provided as to extend through a center portion of said turbine shaft, while said second steam recovering passage is so provided as to extend along the outer periphery of said first steam feeding passage, and wherein said second steam feeding passages and said first steam recovering passages pass through substantially radially intermediate portions of each disk, respectively.

2. A steam-cooling type gas turbine according to claim 1, further comprising:
   a plurality of recesses provided so as to extend in a radial direction in a coupling portion interposed between the final-stage disk and said turbine shaft, wherein said second steam feeding passages are interconnected to said first steam feeding passage by way of said recesses; and
   third steam recovering passages provided in said turbine shaft at a rear side of said coupling portion so as to extend in a radial pattern, wherein said first steam recovering passages and said second steam recovering passages are interconnected by way of said third steam recovering passages.

3. A steam-cooling type gas turbine according to claim 1, wherein a thermal shield cylinder is mounted on an inner peripheral wall defining outer peripheries of said second steam recovering passages with a predetermined space being held relative to said inner peripheral wall.

4. A steam-cooling type gas turbine according to claim 1, further comprising:
   a seal portion connected to said second steam recovering passage at a rear end thereof and forming a part of said second steam recovering passage, said seal portion including a rotatable cylindrical seal member having a plurality of fins formed in the outer peripheral surface thereof and a stationary cylindrical seal member enclosing said rotatable cylindrical seal member and having a plurality of fins formed in the inner peripheral surface thereof in opposition to the fins of said rotatable cylindrical seal member; and
   a cylindrical centering member for securing together said rotatable cylindrical seal member and a rear end portion of said first steam feeding passage.

5. A steam-cooling type gas turbine according to claim 1, further comprising:
   a plurality of supporting members provided between the inner peripheral surface of said second steam recovering passage and the outer peripheral surface of said first steam feeding passage with a predetermined distance being held between the adjacent ones of said supporting members in the circumferential direction,
   wherein both end portions of said first steam feeding passage are slidable in the axial direction.

6. A steam-cooling type gas turbine according to claim 1, further comprising:
   at least one annular groove formed in and along an outer periphery of said first steam feeding passage between a front end portion of said first steam feeding passage and said turbine shaft; and
   a piston ring provided within said groove.

7. A steam-cooling type gas turbine according to claim 1, wherein each of said second steam feeding passages and said first steam recovering passages are constituted by a steam feeding pipe and a steam recovering pipe, respectively, which are inserted into pipe receiving holes formed so as to extend through said disks at said plural stages, respectively,
   each of said pipes being previously applied with a tension load in a direction from an upstream side to a downstream side,
   said tension load being sustained by engaging a sleeve member fitted into an upstream tip end portion of said pipe with an outer side surface of a first-stage disk at an upstream side thereof.

8. A steam-cooling type gas turbine according to claim 7, further comprising:
   a first alternating concave/convex portion formed in an upstream tip end portion of each of said pipes, and
   said sleeve member being split into two halves in a circumferential direction along a longitudinal axis and including a cylindrical body portion having a second alternating concave/convex portion fitted to said first alternating concave/convex portion, and a flange portion extending radially outwardly from an outer end of said cylindrical body portion of said sleeve member to engage the outer side surface of said first-stage disk at an upstream side thereof.

9. A steam-cooling type gas turbine according to claim 1, wherein said second steam feeding passages and said first steam recovering passages are annularly aligned on a single circle at each disk, respectively.

10. A steam-cooling type gas turbine according to claim 1, wherein the feeding steam passes through a coupling portion interposed between the final-stage disk and said turbine shaft, and the recovering steam passes through at a rear side of said coupling portion.

11. A steam-cooling type gas turbine, comprising:
   a turbine shaft for supporting plural stages of disks and plural stages of moving blades;
   a first steam feeding passage formed internally of said turbine shaft so as to feed steam from a rear end side of said turbine shaft along an axial direction thereof,
   a plurality of second steam feeding passages for introducing the steam into said disks from said first steam feeding passage to thereby feed said steam to said moving blades for cooling thereof;
   first steam recovering passages formed in said disks, respectively, so as to receive and recover the steam after cooling of said individual moving blades;
   a second steam recovering passage provided internally of said turbine shaft in communication with said first steam recovering passages, respectively, so as to recover the steam after cooling of said moving blades;

a plurality of recesses provided so as to extend in a radial direction in a coupling portion interposed between the final-stage disk and said turbine shaft, wherein said second steam feeding passages are interconnected to said first steam feeding passage by way of said recesses; and third steam recovering passages provided in said turbine shaft at a rear side of said coupling portion so as to extend in a radial pattern, wherein said first steam recovering passages and said second steam recovering passages are interconnected by way of said third steam recovering passages;

wherein said first steam feeding passage is so provided as to extend through a center portion of said turbine shaft, while said second steam recovering passage is so provided as to extend along the outer periphery of said first steam feeding passage.

12. A steam-cooling type gas turbine, comprising:

a turbine shaft for supporting plural stages of disks and plural stages of moving blades;

a first steam feeding passage formed internally of said turbine shaft so as to feed steam from a rear end side of said turbine shaft along an axial direction thereof;

a plurality of second steam feeding passages for introducing the steam into said disks from said first steam feeding passage to thereby feed said steam to said moving blades for cooling thereof;

first steam recovering passages formed in said disks, respectively, so as to receive and recover the steam after cooling of said individual moving blades;

a second steam recovering passage provided internally of said turbine shaft in communication with said first steam recovering passages, respectively, so as to recover the steam after cooling of said moving blades;

a plurality of supporting members provided between the inner peripheral surface of said second steam recovering passage and the outer peripheral surface of said first steam feeding passage with a predetermined distance being held between the adjacent ones of said supporting members in the circumferential direction;

wherein said first steam feeding passage is so provided as to extend through a center portion of said turbine shaft, while said second steam recovering passage is so provided as to extend along the outer periphery of said first steam feeding passage;

wherein both end portions of said first steam feeding passage are slidable in the axial direction.

13. A steam-cooling type gas turbine, comprising:

a turbine shaft for supporting plural stages of disks and plural stages of moving blades;

a first steam feeding passage formed internally of said turbine shaft so as to feed steam from a rear end side of said turbine shaft along an axial direction thereof;

a plurality of second steam feeding passages for introducing the steam into said disks from said first steam feeding passage to thereby feed said steam to said moving blades for cooling thereof;

first steam recovering passages formed in said disks, respectively, so as to receive and recover the steam after cooling of said individual moving blades;

a second steam recovering passage provided internally of said turbine shaft in communication with said first steam recovering passages, respectively, so as to recover the steam after cooling of said moving blades;

at least one annular groove formed in and along an outer periphery of said first steam feeding passage between a front end portion of said first steam feeding passage and said turbine shaft; and a piston ring provided within said groove;

wherein said first steam feeding passage is so provided as to extend through a center portion of said turbine shaft, while said second steam recovering passage is so provided as to extend along the outer periphery of said first steam feeding passage.

14. A steam-cooling type gas turbine, comprising:

a turbine shaft for supporting plural stages of disks and plural stages of moving blades;

a first steam feeding passage formed internally of said turbine shaft so as to feed steam from a rear end side of said turbine shaft along an axial direction thereof;

a plurality of second steam feeding passages for introducing the steam into said disks from said first steam feeding passage to thereby feed said steam to said moving blades for cooling thereof;

first steam recovering passages formed in said disks, respectively, so as to receive and recover the steam after cooling of said individual moving blades; and a second steam recovering passage provided internally of said turbine shaft in communication with said first steam recovering passages, respectively, so as to recover the steam after cooling of said moving blades;

wherein said first steam feeding passage is so provided as to extend through a center portion of said turbine shaft, while said second steam recovering passage is so provided as to extend along the outer periphery of said first steam feeding passage;

wherein each of said second steam feeding passages and said first steam recovering passages are constituted by a steam feeding pipe and a steam recovering pipe, respectively, which are inserted into pipe receiving holes formed so as to extend through said disks at said plural stages, respectively, each of said pipes being previously applied with a tension load in a direction from a upstream side to a downstream side, said tension load being sustained by engaging a sleeve member fitted into an upstream tip end portion of said pipe with an outer side surface of a first-stage disk at an upstream side thereof.

15. A steam-cooling type gas turbine according to claim 14, further comprising:

a first alternating concavel/convex portion formed in an upstream tip end portion of each of said pipes, and said sleeve member being split into two halves in a circumferential direction along a longitudinal axis and including a cylindrical body portion having a second alternating concave/convex portion fitted to said first alternating concave/convex portion, and a flange portion extending radially outwardly from an outer end of said cylindrical body portion of said sleeve member to engage the outer side surface of said first-stage disk at an upstream side thereof.

16. A steam-cooling type gas turbine according to claim 15, wherein said first and second alternating concave/convex portions are mating threaded portions.

17. A steam-cooling type gas turbine, comprising:

a turbine shaft for supporting plural stages of disks and plural stages of moving blades;

a first steam feeding passage formed internally of said turbine shaft so as to feed steam from a rear end side of said turbine shaft along an axial direction thereof;

a plurality of second steam feeding passages for introducing the steam into said disks from said first steam feeding passage to thereby feed said steam to said moving blades for cooling thereof;

first steam recovering passages formed in said disks, respectively, so as to receive and recover the steam after cooling of said individual moving blades; and a second steam recovering passage provided internally of said turbine shaft in communication with said first steam recovering passages, respectively, so as to recover the steam after cooling of said moving blades;

wherein said second steam feeding passages and said first steam recovering passages pass through substantially radially intermediate portions of said disks, respectively, and wherein said second steam feeding passages and said first steam recovering passages are formed by pipes.

18. A steam-cooling type gas turbine according to claim 16, wherein the feeding steam passes through a coupling portion interposed between the final-stage disk and said turbine shaft, and the recovering steam passes through at rear side of said coupling portion.

19. A steam-cooling type gas turbine according to claim 17, further comprising:

a seal portion connected to said second steam recovering passage at a rear end thereof and forming a part of said second steam recovering passage, said seal portion including a rotatable cylindrical seal member having a plurality of fins formed in the outer peripheral surface thereof and a stationary cylindrical seal member enclosing said rotatable cylindrical seal member and having a plurality of fins formed in the inner peripheral surface thereof in opposition to the fins of said rotatable cylindrical seal member; and a cylindrical centering member for securing together said rotatable cylindrical seal member and a rear end portion of said first steam feeding passage.

20. A steam-cooling type gas turbine, comprising:

a turbine shaft for supporting plural stages of disks and plural stages of moving blades;

a first steam feeding passage having a steam inlet opening at a rear end of said turbine shaft so as to feed steam through said steam inlet opening along an axial direction of said turbine shaft;

a plurality of second steam feeding passages for introducing the steam into said disks from said first steam feeding passage to thereby feed said steam to said moving blades for cooling thereof;

first steam recovering passages formed in said disks, respectively, so as to receive and recover the steam after cooling of said individual moving blades;

a second steam recovering passage provided internally of said turbine shaft in communication with said first steam recovering passages, respectively, so as to recover the steam after cooling of said moving blades, said second steam recovering passage having a steam outlet opening at the rear end of said turbine shaft to thereby discharge the steam through the steam outlet opening; and a thermal shield formed so as to be inserted into said turbine shaft from a rear end thereof and located close to a bearing means for said turbine shaft therein, said thermal shield being fixed at least at the rear end of said turbine shaft.

* * * * *